FIG. 1
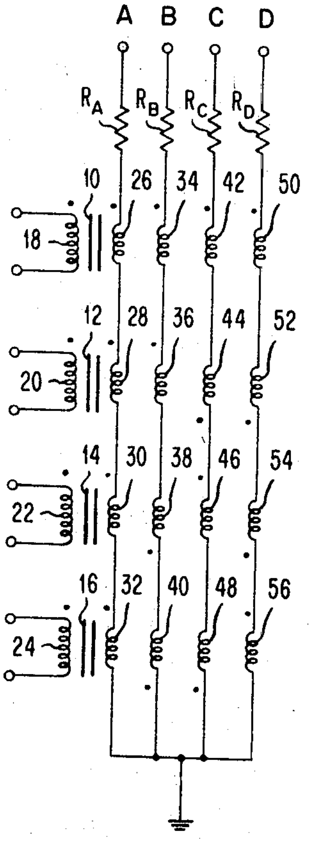
FIG. 2
| TABLE 1 | | | |
|---|---|---|---|
| A | B | C | D |
| + | + | + | + |
| + | + | − | − |
| + | − | + | − |
| + | − | − | + |
FIG. 3
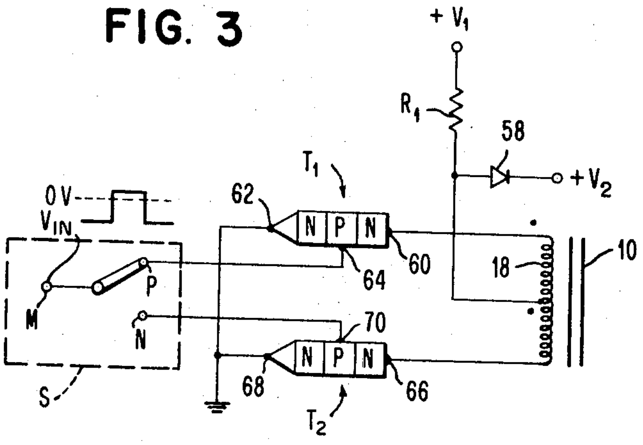
INVENTOR
LOUIS A. RUSSELL
BY Frank Chadenfing
ATTORNEY

TABLE 2

| $A_8$ | $B_8$ | $C_8$ | $D_8$ | $E_8$ | $F_8$ | $G_8$ | $H_8$ |
|---|---|---|---|---|---|---|---|
| + | + | + | + | + | + | + | + |
| + | − | + | − | + | − | + | − |
| + | + | − | − | + | + | − | − |
| + | − | − | + | + | − | − | + |
| + | + | + | + | − | − | − | − |
| + | − | + | − | − | + | − | + |
| + | + | − | − | − | − | + | + |
| + | − | − | + | − | + | + | − |

3,371,218

MAGNETIC SWITCHING DEVICES

Louis A. Russell, Poughkeepsie, N.Y., assignor to International Business Machines Corporation, New York, N.Y., a corporation of New York Continuation of application Ser. No. 35,051, June 9, 1960. This application May 8, 1964, Ser. No. 366,690
17 Claims. (Cl. 307—88)

This invention relates to switching devices and more particularly to improved magnetic switches. This application is a continuation of application Serial No. 35,051 now abandoned which was filed June 9, 1960.

Data processing machines employ a memory which may be of the magnetic core type comprising a group of memory planes each consisting of a plurality of magnetic cores arranged in a matrix of columns and rows. Generally, each plane is provided with separate row windings each inductively coupling a row of cores and separate column windings each inductively coupling a column of cores. The corresponding row windings and the corresponding column windings are respectively connected serially so that a selected row and column winding intersect a group of cores occupying corresponding positions in the memory planes. Excitation of both a selected and column winding causes the cores at the intersections of these windings to have their magnetic condition changed. Thus, a group of memory cores, corresponding to the bits of a data word, may be selected by applying a drive pulse coincidently to a selected row and column winding of each memory plane in the group. Each plane is also provided with a sense winding inductively coupled to all of the cores in the plane to sense the change in magnetic conditions of the selected core in the plane.

Selection of row windings and column windings may be accomplished by a magnetic switch. One type of magnetic switch is the decoding type which consists of a plurality of magnetic cores having a plurality of windings inductively coupled thereto in accordance with a predetermined combinatorial code. Each core has an output winding connected to a row or column winding of the memory. Drive means are provided for applying drive pulses coincidently to selected ones of the windings so that a desired one of the cores has its magnetic condition changed inducing a signal in its output winding which is used to drive a selected row or column winding of the memory.

One of the major problems encountered in the magnetic switches is that of unwanted signals, termed "noise," generated in the unselected cores when the selected core is being driven, while a further disadvantage is that the drive power to a core is furnished by a single or at most two power sources. Thus, where the windings pass through all of the cores in a predetermined combinatorial code, the magnetic effect due to the drive currents passing through an unselected core in the same sense is partially cancelled by the magnetic effect due to the drive currents passing through the unselected core in the opposite sense. However, the net magnetic effect causes the unselected core to be driven a small amount thereby inducing a small undesirable noise signal in the output winding thereof. This spurious output is applied to an unselected winding of the memory and may start to switch an unselected group of memory cores tending to destroy their stored information or produce incorrect outputs from memory. Furthermore, the drivers must furnish the additional power which goes into these spurious signals and does no useful work.

A class of load sharing switches which eliminate the problems of spurious outputs and partial switching of unselected cores and permits the power from several sources to be combined into a single high powered output signal has been described in an article entitled "A Load Sharing Matrix Switch," by G. Constantine, appearing in the IBM Journal of Research and Development, vol. 2, pp. 204–211, July 1958, and a further article entitled, "Doubling the Efficiency of the Load-Sharing Matrix Switch," IBM Journal of Research and Development, vol. 3, pp. 194–196, April 1959.

While these prior art switches eliminate spurious outputs from nonselected cores, in order to provide selection the number of turns of the output winding of a particular core must be large to develop desired voltage or the flux capacity of the cores must be made large to develop the necessary voltage.

By constructing a switch in accordance with the teachings of this invention, the above disadvantages are overcome. More specifically, a switch is constructed comprising a plurality of magnetizable elements, such as cores, an input winding is provided on each said core for causing coincident flux changes in all said elements, and a plurality of output lines is provided each coupling all said elements in accordance with a predetermined combinatorial code which is responsive to the flux changes in said elements to provide an output signal on a selected one of said output lines. More specifically, a plurality of cores is provided made of saturable reactor type material each having an input winding thereon which is adapted to energize the core with either a positive or negative polarity impulse governed by address selection means which causes either a positive or negative flux change in the cores. A plurality of output lines is provided each coupling all of the cores in accordance with a predetermined combinatorial code which is responsive to the energization of said cores by said input windings to induce thereon equal outputs from each core, the sum of which is zero on the unselected lines and provides an output signal on the selected line which is the total sum of the equal outputs from each core.

Accordingly, an object of the present invention is to provide a new and improved magnetic switch.

Another object of this invention is to provide a novel magnetic switch having fewer output turns per magnetic element and separate inputs for each element.

Still another object of this invention is to provide an improved load sharing magnetic switch.

A further object of this invention is to provide a novel load sharing magnetic switch which avoids spurious outputs.

Still a further object of this invention is to provide a load sharing magnetic switch employing voltage summation.

Yet a further object of this invention is to provide an improved magnetic matrix switch.

Another object of this invention is to provide a novel load sharing magnetic matrix switch.

The foregoing and other objects, features and advantages of the invention will be apparent from the following more particular description of preferred embodiments of the invention, as illustrated in the accompanying drawings.

In the drawings:

FIG. 1 is a schematic drawing of a magnetic switch embodying the present invention.

FIG. 2 is a table illustrating the relative polarities produced in the embodiment of FIG. 1 for one selection operation.

FIG. 3 is a schematic drawing of a control circuit for use in the embodiment of FIG. 1.

Figures 4, 5:
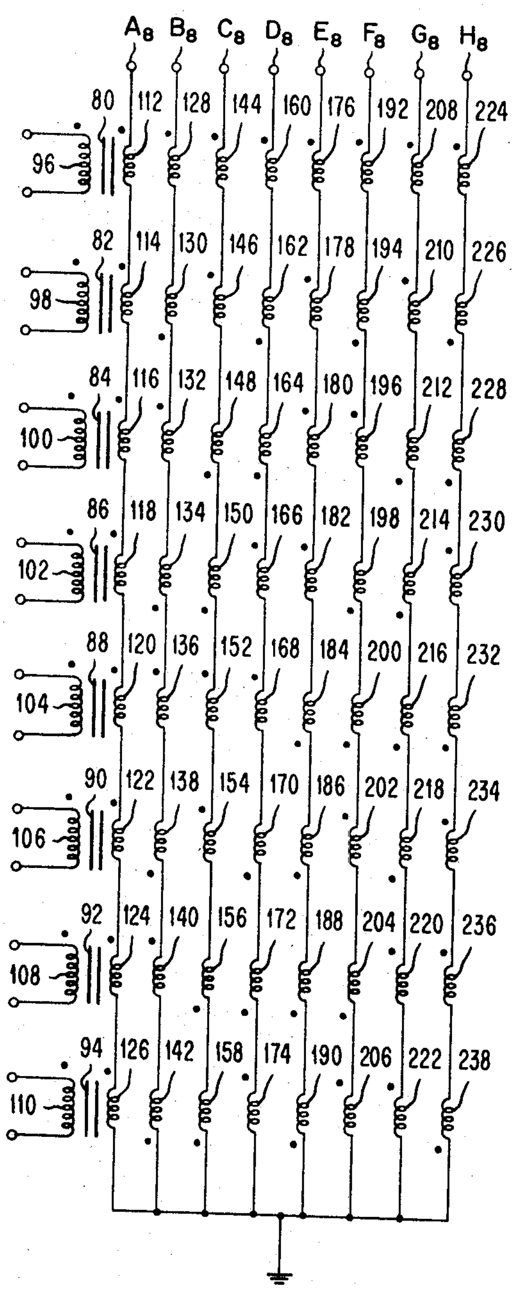
FIG. 4 is a schematic drawing of another embodiment of this invention.
FIG. 5 is a table illustrating the relative polarities providing in the embodiment of FIG. 4 in a particular selection operation.

Referring now to the FIG. 1, there is shown a schematic diagram of one embodiment of the present invention. It comprises a magnetic switch which includes four magnetic cores, 10, 12, 14 and 16, which may be toroidal in shape, though other suitable shapes may be employed. Four input windings, 18, 20, 22 and 24 are provided each coupling the cores 10, 12, 14 and 16, respectively. A plurality of output lines, A, B, C and D is provided each coupling all the cores 10, 12, 14 and 16 in accordance with a predetermined combinatorial code through a load $R_a$, $R_b$, $R_c$ and $R_d$, respectively, and each terminating in ground. The loads R may be considered as a row or column winding linking the bistable elements of a memory. The output line A serially couples the cores 10, 12, 14 and 16 by windings 26, 28, 30 and 32, respectively; the output line B serially couples the cores 10, 12, 14 and 16 by windings 34, 36, 38 and 40, respectively; the output line C serially couples the cores 10, 12, 14 and 16 by means of windings 42, 44, 46 and 48, respectively; while the output line D serially couples each of the cores 10, 12, 14 and 16 by means of windings 50, 52, 54 and 56, respectively.

A dot is shown adjacent one terminal of each of the windings illustrated in FIG. 1, indicating its winding direction. A positive pulse which is directed into the undotted end of the winding terminal tends to cause a positive flux change in the core, while a positive pulse directed into the dotted end of the winding terminal tends to cause a negative flux change in the core. Thus, a positive pulse directed into the dotted end of the winding terminal causing a negative flux change in the core associated therewith causes the dotted end of the winding terminals associated therewith to become positive while conversely a positive flux change taking place within the cores causes the undotted terminal end of the winding associated therewith to become positive.

Referring to the FIG. 2, there is illustrated, by means of plus (+), and minus (−) signs the relative winding arrangements of each of the windings 26–56 associated with each of the output lines A, B, C and D which is labelled Table I. Each column of the Table I is designated by a particular output line A, B, C and D and each box thereunder represents the sense in which the different windings couple the different cores. For instance, under the column designated A, there is shown a + in the first box, which corresponds to the sense in which the winding 26 couples the core 10, while similarly the successive boxes show a + sign designating a similar coupling for each of the successive cores 12, 14 and 16.

It may be seen, with reference to the FIGS. 1 and 2, that with each of the input windings 18, 20, 22 and 24 of the cores 10, 12, 14 and 16, respectively, energized to provide a flux change within the cores to cause the windings 26, 28, 30 and 32 of the output line A to provide a positive output voltage thereon, that the summation of the output voltages induced on the remaining windings, constituting the output lines B, C and D, is zero net voltage, while the voltage produced on the output line A is positive, provided by the summation of all the voltages induced on the output windings 26, 28, 30 and 32. Similarly, then, by reversing this input condition to all the cores, the output line A is again selected, but now provides a negative signal thereon, while the remaining output lines provide zero net voltage. If, however, the output line B were the one to be selected to provide a positive output signal, then the input windings 18 and 20 on the cores 10 and 12 would be provded with an impulse of one polarity to provide a positive output on the windings 34 and 36 of the cores 10 and 12, respectively, while the windings 22 and 24 on the cores 14 and 16, respectively, are both provided with an impulse of opposite polarity to provide an output on the windings 38 and 40, respectively, which is positive. The summation of voltages of the windings 34 through 40 constituting the output line B is then all positive, while the summation of the outputs on the remaining output lines A, C and D is zero. To provide a reverse polarity signal on the output line B one need only reverse the sense of the input impulses to the input windings of the cores.

Referring to the FIG. 3, there is shown one form of a bipolar, constant voltage, drive circuit for each of the cores 10–16 of the FIG. 1. The circuit of FIG. 3 is shown associated with the core 10 of the FIG. 1 and its input winding 18. The input winding 18 on the core 10 is center tapped and connected to a source of voltage $+V_1$, through a resistor $R_1$ and a voltage source $+V_2$ through a diode 58, which connections act as a current limiting circuit. One end of the winding 18 is connected to a collector electrode 60 of an NPN transistor $T_1$, having emitter electrode 62 and base electrode 64. The other end of the winding 18 is connected to a collector electrode 66 of another NPN transistor $T_2$, having emitter electrode 68 and base electrode 70. The emitter electrodes 62 and 68 of transistors $T_1$ and $T_2$, respectively, are commoned to ground; the base electrode 64 of $T_1$ is connected to one terminal P of a switch S while the base electrode 70 of $T_2$ is connected to another terminal N of the switch S. The switch S is provided with common terminal M to which an input signal $V_{in}$ is selectively applied.

Assuming the switch S is so positioned to connect the terminal M to the terminal P, upon occurrence of the positive going signal $V_{in}$ the base electrode 64 of the transistor $T_1$ becomes positive with respect to the collector electrode 60 thereof to provide a current from the source $+V_1$ through the winding 18 to ground through the transistor $T_1$. The current through the input winding 18 of core 10 causes a positive flux change in the core 10 to induce a voltage on its associated output windings. When the switch S is positioned to connect the terminal M to the terminal N upon occurrence of the positive going impulse $V_{in}$, the base 70 of $T_2$ is conditioned positive with respect to the collector electrode 66 providing a current from the source $+V_1$ through the resistor $R_1$ input winding 18 to ground through the transistor $T_2$. Thus, with the switch S connecting the terminal M to the terminal N, the input winding 18 is energized to cause a negative flux change in the core 10 to induce a voltage on the associated output windings thereof. It should be realized that although the switch S is shown as a single pole double throw switch other type of switching devices may be employed.

Referring now to the FIG. 4, another embodiment of this invention is shown illustrating an eight output load sharing switch. There is provided, in the FIG. 4, eight magnetic cores 80, 82, 84, 86, 88, 90, 92 and 94 having input windings 96, 98, 100, 102, 104, 106, 108 and 110, respectively. Coupling each of the cores is a number of output lines labelled $A_8$, $B_8$, $C_8$, $D_8$, $E_8$, $F_8$, $G_8$ and $H_8$. Each of the cores 80, 82, 84, 86, 88, 90, 92 and 94 is coupled by the output line $A_8$ by means of output windings 112–126, respectively; the output line $B_8$ couples the cores by means of output windings 128–142, respectively; the output line $C_8$ couples each of the cores by means of output windings 144–158, respectively; the output line $D_8$ couples each of the cores by means of output windings 160–174, respectively; the output line $E_8$ couples each of the cores by means of output windings 176–190, respectively, output line $F_8$ couples each of the cores by means of output windings 192–206, respectively; the output line $G_8$ couples each of the cores by means of output windings 208–222, respectively; while the output line $H_8$ couples each of the cores by means of output windings 224–238, respectively, and each of the output lines have one end terminating in ground.

Referring now to the FIG. 5, a chart similar to that shown in the FIG. 2 for the FIG. 1 is here shown for the FIG. 4 and labelled Table II. Referring to both the FIG. 4 and FIG. 5 it may be seen that if each of the cores are coincidently energized to provide a positive flux linkage then the output line $A_8$ is the selected line and provides a positive output signal to the memory while the unselected lines provide zero net output voltage. Reversal of the switch position S of the FIG. 3 for all the input lines again selects the output line $A_8$ but here provides an output voltage of negative polarity.

Assuming the output line $E_8$ is to be selected to provide a positive voltage to memory, then the input windings 96 through 102 of the cores 80 through 86 are selected to provide an impulse of one polarity while the input windings 104 through 110 of the cores 88–94 are selected to provide an impulse of opposite polarity, thereby providing a positive output signal on each of the windings 176–190. As may be seen with reference to the FIG. 5, with this input condition all the remaining output lines are provided with zero net voltage. Again, reversal of the input condition provides a net negative voltage output signal on the selected output line $E_8$ while the remaining lines are provided with zero net voltage.

It may be seen with reference to the embodiments of FIG. 1 and FIG. 4 that in order to employ voltage summation techniques that the output voltage induced on each of the windings must be substantially equal and that each such switch should have X inputs with X number of output lines making up a matrix of $X=2^n$, where $n$ is an integer, of inputs and outputs.

While the invention has been particularly shown and described with reference to preferred embodiments thereof, it will be understood by those skilled in the art that various changes in form and details may be made therein without departing from the spirit and scope of the invention.

What is claimed is:

1. A magnetic switch comprising:

a plurality of magnetic elements, each said magnetic element being responsive to an applied input voltage of either one of two polarities to provide a significant flux change therein;

a plurality of input lines equal in number to said plurality of said elements, each said input line having only one input winding on a respective one of said elements;

a plurality of output lines, each said output line having a plurality of serially connected output windings equal in number to said plurality of said elements, each of said output windings being on a respective one of said elements;

means for coincidently energizing said input lines on said elements by respective input voltages having one of two polarities in accordance with a plurality of combinations of voltages, each said element responding to said input voltage to produce a significant flux change in each said element via the respective input windings, thereby inducing a voltage change in a direction comparable to the polarity of said input voltage in each said output winding connected to said latter element;

said voltage changes induced in said output windings of one of said output lines being of the same polarity to provide a net output voltage on said latter output line by summation; and said voltage changes induced in said output windings of each said other lines being one half of one polarity and one half of the opposite polarity to obtain zero output voltage on said latter lines by cancellation, whereby application of said input voltages in accordance with said plurality of combinations of voltages to said input lines effects a voltage output on a particular one of said output lines.

2. A magnetic switch according to claim 1 in which each said magnetic element is linearly responsive to an applied input voltage.

3. A magnetic switch comprising:

a plurality of magnetic elements, each said element being responsive to an applied input voltage of either one of two polarities to provide a significant flux change therein;

a plurality of input lines equal in number to said plurality of said elements, each said input line having an input winding on only a respective one of said elements;

a plurality of output lines, each said output line having a plurality of serially connected output windings equal in number to said plurality of said elements, each of said output windings being on only a respective one of said elements and being wound thereon in a sense in accordance with a selected combination of a plurality of combinations of senses;

means for coincidently energizing said input lines on said elements by respective input voltages having one of two polarities in accordance with a selected one of a plurality of combinations of voltages, each said element responding to said respective input voltage to produce a significant flux change in said element via said respective input winding, thereby inducing a voltage change in each said output winding connected to said latter element in a direction dependent on said polarity of said input voltage and said latter output winding sense;

said voltage changes induced in said output windings of one of said output lines being of the same polarity to provide a net output voltage on said latter output line by summation; and said voltage changes induced in said output windings of each said other lines being one half of one polarity and one half of the opposite polarity to obtain zero output voltage on said latter lines by cancellation, whereby application of said input voltages in accordance with said selected combination of said plurality of combinations of voltages to said input lines effects a voltage output on a particular one of said output lines.

4. A magnetic switch according to claim 3 in which each said magnetic element is linearly responsive to an applied input voltage.

5. A magnetic switch for providing a voltage of a desired magnitude comprising:

first, second, third and fourth magnetic elements:

first, second, third and fourth input circuits having first, second, third and fourth input windings, respectively, on said magnetic elements respectively;

means for selectively applying first, second, third and fourth combinations of first and second pairs of like polarity voltages to said input circuits;

a first series circuit having first, third and fourth output windings on said magnetic elements, respectively, responsive to said first combination of voltages in said input circuits for producing a voltage of said desired magnitude and responsive to said second, third and fourth combinations of voltages for producing a substantially zero resultant voltage;

a second series circuit having fifth, sixth, seventh and eighth output windings on said magnetic elements, respectively, responsive to said second combination of voltages in said input circuits for producing a voltage of said desired magnitude and responsive to said first, third and fourth combinations of voltages for producing a substantially zero resultant voltage;

a third series circuit having ninth, tenth, eleventh and twelvth output windings on said magnetic elements, respectively, responsive to said third combination of voltages in said input circuits for producing a voltage of said desired magnitude and responsive to said first, second and fourth combinations of voltages for producing a substantially rero resultant voltage; and a fourth series circuit having thirteenth, fourteenth, fifteenth and sixteenth output windings on said magnetic elements, respectively, responsive to said fourth combination of voltages in said input circuits for producing a voltage of said desired magnitude and responsive to said first, second and third combinations of voltages for producing a substantially zero resultant voltage.

6. A magnetic switch for providing a voltage of a desired magnitude comprising:

first, second, third and fourth magnetic elements, each said magnetic element being responsive to an applied input voltage of either one of two polarities to provide a significant flux change therein;

first, second, third and fourth input circuits having first, second, third and fourth input windings, respectively, on said magnetic elements, respectively;

means for selectively applying first, second, third and fourth combinations of first and second pairs of like polarity voltages to said input circuits, each said magnetic element being responsive to an input voltage on said respective input winding to produce a significant flux change therein;

a first series circuit having first, second, third and fourth output windings on said magnetic elements, respectively, responsive to said first combination of voltages in said input circuits for producing a voltage of said desired magnitude and responsive to said second, third and fourth combinations of voltages for producing a substantially zero resultant voltage;

a second series circuit having fifth, sixth, seventh and eighth output windings on said magnetic elements, respectively, responsive to said second combination of voltages in said circuits for producing a voltage of said desired magnitude and responsive to said first, third and fourth combinations of voltages for producing a substantially zero resultant voltage;

a third series circuit having ninth, tenth, eleventh and twelfth output windings on said magnetic elements, respectively, responsive to said third combination of voltages in said input circuits for producing a voltage of said desired magnitude and responsive to said first, second and fourth combinations of voltages for producing a substantially zero resultant voltage; and a fourth series circuit having thirteenth, fourteenth, fifteenth and sixteenth output windings on said magnetic elements, respectively, responsive to said fourth combination of voltages in said input circuits for producing a voltage of said desired magnitude and responsive to said first, second and third combinations of voltages for producing a substantially zero resultant voltage.

7. A magnetic switch according to claim 6 in which each said magnetic element is linearly responsive to an applied input voltage.

8. A magnetic switch for providing a voltage of a desired magnitude comprising:

a given plurality of magnetic elements, each said element being responsive to an applied input voltage of either one of two polarities to provide a significant flux change therein;

a said given plurality of input circuits having a said given plurality of windings on said magnetic elements, respectively;

means for selectively applying to said input circuits one of a said given plurality of combinations of first and second pairs of like polarity voltages, each said magnetic element being responsive to an input voltage on said respective input winding to produce a significant flux change therein, and a said given plurality of series circuits having a said given plurality of windings on said magnetic elements, respectively, each of said series circuit being responsive to a different one of said given plurality of combinations of voltages in said input circuits for producing a voltage of said desired magnitude and responsive to the remaining of said combinations of voltages for producing a substantially zero resultant voltage.

9. A magnetic switch according to claim 8 in which each said magnetic element is linearly responsive to an applied input voltage.

10. A switch for providing a voltage of a desired magnitude comprising:

a first plurality of magnetic elements, each said magnetic element being responsive to an applied input voltage of either one of two polarities to provide a significant flux change therein;

a said first plurality of input circuits having a said first plurality of windings on said magnetic elements, respectively;

means for selectively applying to said circuits one of a said first plurality of combinations of first and second plurality of like polarity voltages, each said magnetic element being responsive to an input voltage on said respective input winding to produce a significant flux change therein; and a said first plurality of series circuits having a said first plurality of windings on said magnetic elements, respectively, each said series circuit being responsive to a different one of said first plurality of combinations of voltages in said input circuits for producing a voltage of said desired magnitude and responsive to the remaining of said combinations of voltages for producing a substantially zero resultant voltage.

11. A magnetic switch according to claim 10 in which each said magnetic element is linearly responsive to an applied input voltage.

12. A magnetic switch comprising:

a first plurality of magnetic elements;

a first plurality of input windings each respectively coupling only a respective one of said elements;

means including said input windings for causing coincident flux changes in all said elements according to a selected pattern of flux changes;

a second plurality of output lines each coupling all said elements in accordance with a predetermined combinatorial code and being responsive to said flux changes in all said elements, whereby there is obtained an output voltage only on a selected one of said output lines in accordance with said selected pattern.

13. A magnetic switch according to claim 12 in which said selected pattern of flux changes is a selected pattern of pairs of flux changes.

14. A magnetic switch comprising:

a first plurality of flux paths made of magnetic material;

a first plurality of input windings respectively coupling only a respective one of said paths;

means including said input windings for causing a selected pattern of positive and negative flux changes simultaneously in all said paths;

a second plurality of output lines each coupling all said paths in accordance with a predetermined combinatorial code and being responsive to said flux changes in all said elements, whereby there is obtained in accordance with said selected pattern a net voltage on a selected one of said output lines and a zero net voltage on the remaining output lines.

15. A magnetic switch according to claim 14 in which said selected pattern of positive and negative flux change is a selected pattern of positive and negative pairs of flux changes.

16. A magnetic switch comprising:

$2^n$ magnetic elements where $n$ is an integer;

$2^n$ input windings respectively coupling only a respective of one said elements;

means including said windings for causing simultaneous flux changes in all said elements according to a selected pattern of flux changes;

$2^n$ output lines each coupling all said elements in accordance with a predetermined combinatorial code and being responsive to said flux changes in said elements, whereby there is obtained a net voltage output on only one of said output lines in accordance with said selected pattern.

17. A magnetic switch according to claim 16 in which said selected pattern of flux change is a selected pattern of pairs of flux changes.

References Cited

UNITED STATES PATENTS 2,912,679 11/1959 Bonorden ---------- 340—174

BERNARD KONICK, *Primary Examiner.*

P. SPERBER, *Assistant Examiner.*